United States Patent
Umetsu

(10) Patent No.: US 6,236,648 B1
(45) Date of Patent: May 22, 2001

(54) CDMA RECEIVER

(75) Inventor: Kazuhiro Umetsu, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/062,702

(22) Filed: Apr. 20, 1998

(30) Foreign Application Priority Data

Apr. 30, 1997 (JP) .................................................. 9-124749

(51) Int. Cl.$^7$ .................................................. H04B 7/216
(52) U.S. Cl. .................... 370/342; 370/515; 375/150; 375/367
(58) Field of Search .................... 370/335, 252, 370/342, 441, 503, 514, 515, 516; 375/147, 148, 149, 150, 346, 367

(56) References Cited

U.S. PATENT DOCUMENTS

| | | | |
|---|---|---|---|
| 4,665,404 | * 5/1987 | Christy et al. | 342/463 |
| 5,349,606 | * 9/1994 | Lovell et al. | 375/147 |
| 5,361,276 | * 11/1994 | Subramanian | 375/147 |
| 5,844,935 | * 12/1998 | Shoji | 370/464 |
| 5,914,943 | * 6/1999 | Higuchi et al. | 370/320 |

FOREIGN PATENT DOCUMENTS

| | | |
|---|---|---|
| 0 522975 | 7/1993 | (EP) . |
| 0 698 971 | 2/1996 | (EP) . |
| 0 726 658 | 8/1996 | (EP) . |
| 9-018446 | 1/1997 | (JP) . |

* cited by examiner

Primary Examiner—Ricky Ngo
(74) Attorney, Agent, or Firm—Venable; Robert J. Frank; Allen Wood

(57) ABSTRACT

In a CDMA receiver, an A/D converter over-samples an analog reception baseband signal with a sampling clock a frequency of which is $2^n$ times higher than a chip clock, and converts it into a digital reception baseband signal. A correlator obtains a correlation value between the digital reception baseband signal and a pilot spreading code which is synchronous with a reception timing. A phase difference detecting unit obtains a phase difference between the digital reception baseband signal and the reception timing based on the correlation value. A timing controlling unit changes the reception timing in such a manner as to eliminate the phase difference obtained by the phase difference detecting unit.

2 Claims, 5 Drawing Sheets

CDMA RECEIVER

BACKGROUND OF THE INVENTION

1. Field of the Invention

The present invention relates to a code division multiple access (CDMA) receiver used for a digital portable telephone or the like, or more particularly to a synchronization tracking circuit of a CDMA receiver.

2. Description of the Related Art

A conventional CDMA receiver of this type is disclosed in JP-A-9-18446, for example.

In the conventional CDMA receiver, as shown in FIG. 1, an analog reception signal is over-sampled and converted into a digital reception signal by an A/D converter 610. A correlator 620 obtains a correlation value between the digital reception signal and a spreading code of a pilot channel (pilot spreading code) in accordance with a reception timing of the receiver. In the process, a reception timing correlator 621 obtains a correlation value between the digital reception signal and the pilot spreading code which is synchronous with a present reception timing. An early timing correlator 622 obtains a correlation value between the digital reception signal and the pilot spreading code which is synchronous with an early reception timing having a phase ahead of the present reception timing. A late timing correlator 623 obtains a correlation value between the digital reception signal and the pilot spreading code which is synchronous with a late reception timing signal having a phase lagging behind the present reception timing.

A phase difference detecting unit 630 obtains a phase difference between the reception signal and the present reception timing based on the three correlation values obtained by the correlator 620. A timing controlling unit 640 synchronizes the reception timing, which is used for obtaining the correlation values in the correlator 620, with the reception signal by shifting the reception timing in such a direction as to eliminate the phase difference obtained by the phase difference detecting unit 630. In the case where the reception timing is shifted intentionally, the direction of the phase difference to be shifted and the angle to be shifted are indicated to the timing controlling unit 640.

With the above-mentioned conventional CDMA receiver, the system configuration is restricted for selection of the sampling frequency of the A/D converter 610. Nevertheless, any sampling frequency can be selected.

An arbitrary selection of the sampling frequency, however, makes it necessary to perform a dividing operation for calculating, setting and implementing a correction value of the reception timing when the phase difference between the reception signal and the reception timing is detected to correct the reception timing. The result is longer time required for calculating the correction value of the reception timing.

SUMMARY OF THE INVENTION

An object of the present invention is to provide a CDMA receiver capable of shortening the time required for calculating a correction value of a reception timing.

According to a first aspect of the present invention, there is provided a CDMA receiver which comprises: an A/D converter for over-sampling an analog reception baseband signal with a sampling clock having a frequency $2^n$ times higher than that of a chip clock and for converting the analog reception baseband signal into a digital reception baseband signal; a correlator for obtaining a correlation value between the digital reception baseband signal and a pilot spreading code which is synchronous with a reception timing; a phase difference detecting unit for obtaining a phase difference between the digital reception baseband signal and the reception timing based on the correlation value; and a timing controlling unit for changing the reception timing so as to eliminate the phase difference.

According to a second aspect of the present invention, there is provided a CDMA receiver, wherein the timing controlling unit includes a chip phase shifting unit for changing the reception timing in chips; and a $1/2^n$-chip phase shifting unit for changing the reception timing in $1/2^n$ chips.

According to a third aspect of the present invention, there is provided a CDMA receiver, wherein the timing controlling is constituted using a synchronizing circuit.

DESCRIPTION OF THE PREFERRED EMBODIMENTS (First Embodiment)

Figure 1:
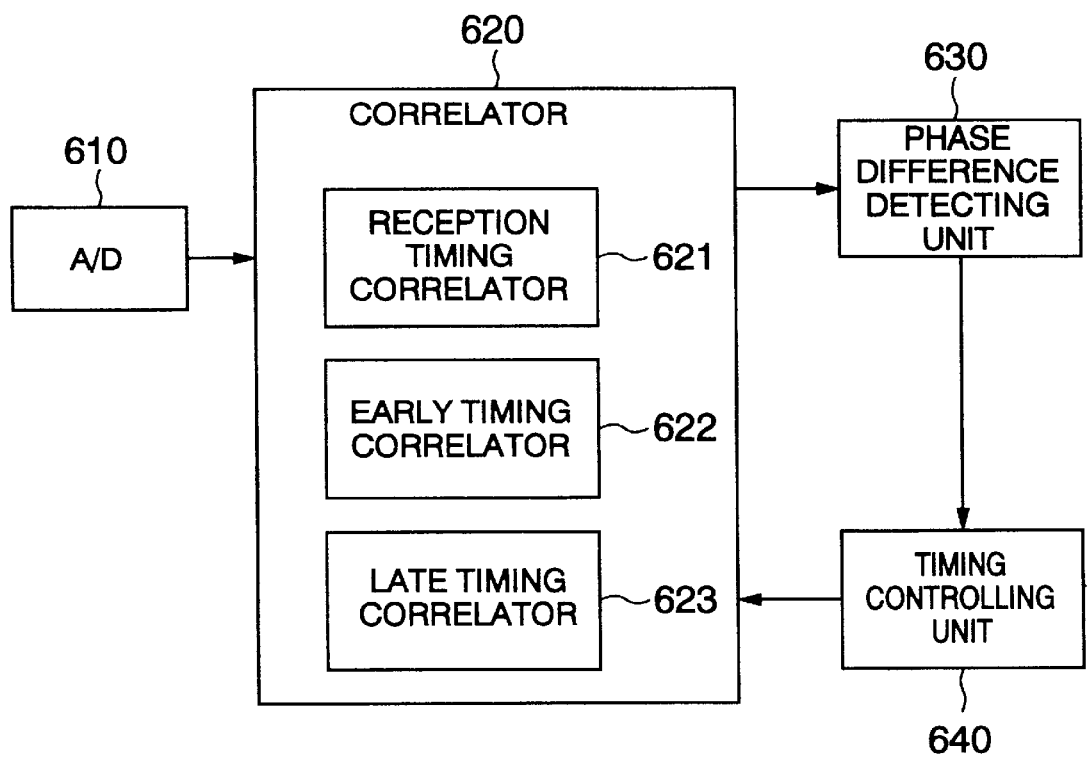
FIG. 1 is a block diagram showing a configuration of a conventional CDMA receiver.
Figure 2:
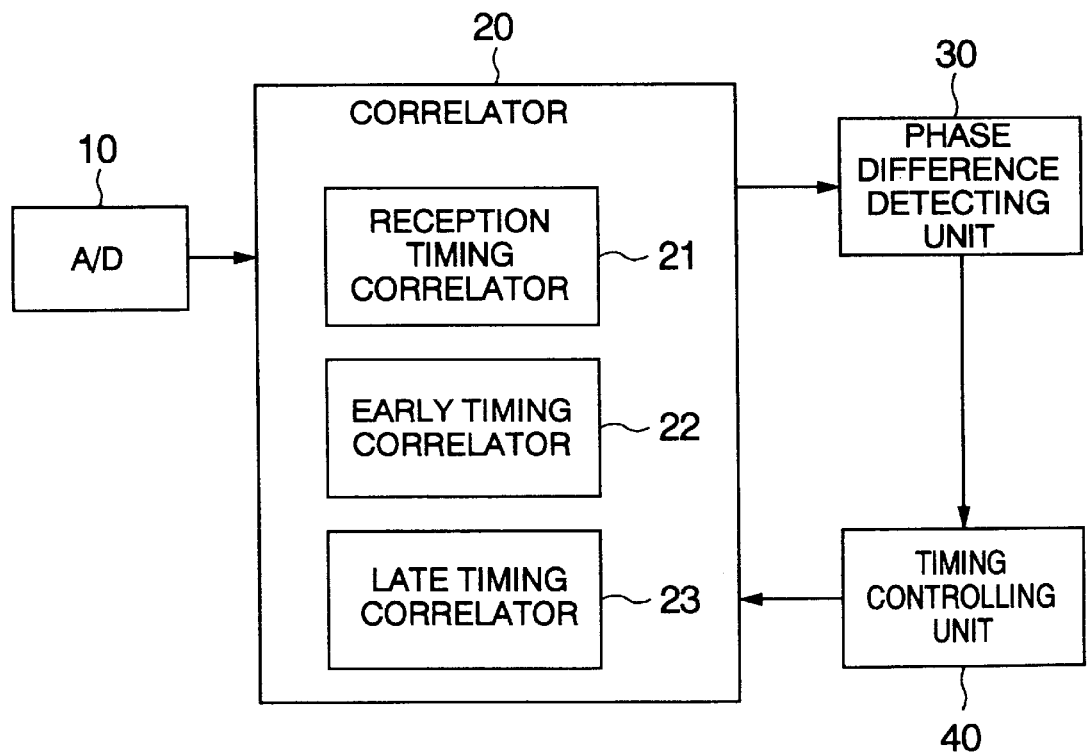
FIG. 2 is a block diagram showing a configuration of a CDMA receiver according to a first embodiment of the present invention.

In a CDMA receiver according to a first embodiment of the present invention, a frequency of a sampling clock of an A/D converter is set to a value $2^n$ times higher than that of a chip clock. As shown in FIG. 2, the CDMA receiver according to this embodiment comprises an A/D converter 10; a correlator 20 which includes a reception timing correlator 21, an early timing correlator 22 and a late timing correlator 23; a phase difference detecting unit 30; and a timing controlling unit 40.

In the A/D converter 10, an analog reception baseband signal obtained by frequency change and orthogonal detection of a reception high-frequency signal in a RF section (not shown) is over-sampled with the sampling clock the frequency of which is $2^3$ (=8) times higher than that of the chip clock, and is converted into a digital reception baseband signal.

Each of the reception timing correlator 21, the early timing correlator 22 and the late timing correlator 23 of the correlator 20 is a circuit for obtaining a correlation value between the digital reception baseband signal and a pilot spreading code (a spreading code used for a pilot channel), and comprises a pilot spreading code generator, a complex correlator and a symbol integrator. The operation timings of these correlators are controlled by the timing controlling unit

40. The reception timing correlator 21 obtains a correlation value between the digital reception baseband signal and the pilot spreading code which is synchronous with the present reception timing. The early timing correlator 22 obtains a correlation value between the digital reception baseband signal and the pilot spreading code which is synchronous with an early reception timing having a phase ahead of the present reception timing. The late timing correlator 23 obtains a correlation value between the digital reception baseband signal and the pilot spreading code which is synchronous with a late reception timing having a phase lagging behind the present reception timing.

The phase difference detecting unit 30 obtains a phase difference between the digital reception baseband signal and the present reception timing based on the three correlation values outputted from the correlator 20, judges whether the present reception timing is coincident with the digital reception baseband signal, and in the case where it is not coincident, indicates a control amount for correcting the reception timing to the timing controlling unit 40. Also, in the case where the reception timing is to be shifted intentionally, the amount of the intended shift is indicated from the phase difference detecting unit 30 to the timing controlling unit 40. The timing controlling unit 40 shifts the reception timing of the receiver in compliance with the indication from the phase difference detecting unit 30.

Figure 3:
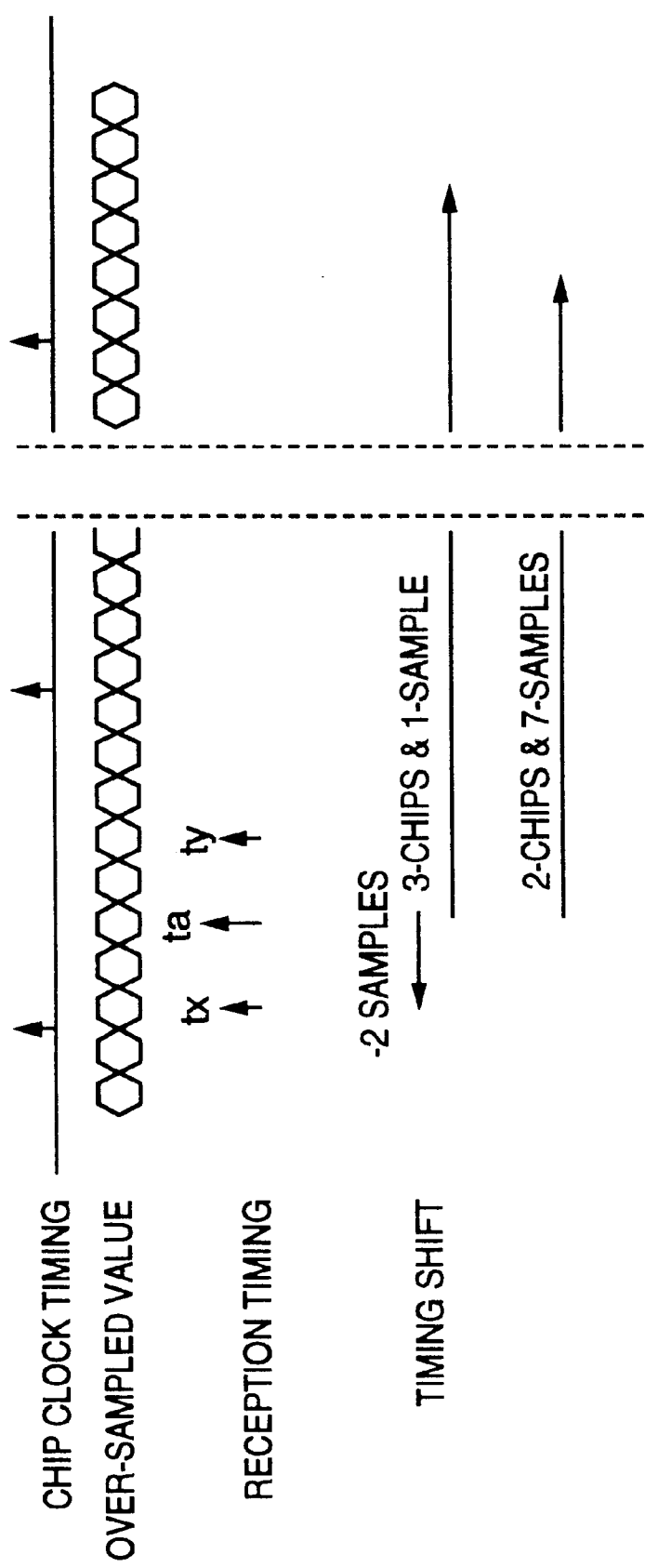
FIG. 3 is a timing chart for explaining the operation of the CDMA receiver shown in FIG. 2.

The operation of the CDMA receiver according to this embodiment will be described with reference to FIG. 3. The analog reception baseband signal is over-sampled with the sampling clock the frequency of which is $2^3$ (=8) times higher than that of the chip clock (refer to a chip clock timing and a over-sampled value in FIG. 3), and is converted into the digital reception baseband signal by the A/D converter 10. Assuming that the present reception timing (the reception timing presently indicated by the timing controlling unit 40 to the correlator 20) is given as a reception timing ta shown in FIG. 3, the reception timing correlator 21 obtains the correlation value between the digital reception baseband signal and the pilot spreading code which is synchronous with the reception timing ta. The early timing correlator 2 obtains the correlation value between the digital reception baseband signal and the pilot spreading code which is synchronous with an early reception timing tx having a phase ahead of the reception timing ta. Further, the late timing correlator 23 obtains the correlation value between the digital reception baseband signal and the pilot spreading code which is synchronous with a late reception timing ty having a phase lagging behind the reception timing ta. The phase difference detecting unit 30 detects the phase difference between the digital reception baseband signal and the present reception timing based on the three correlation values thus obtained. The timing controlling unit 40 shifts the reception timing in such a direction as to eliminate the phase difference detected in the phase difference detecting unit 30.

For shifting the reception timing by about two samples forward (in x direction), for example, the direction and the control amount of two samples are indicated from the phase difference detecting unit 30 to the timing controlling unit 40. In the process, if the reception timing is intentionally shifted backward (in the y direction) by three chips and one sample (one chip equals 8 samples), this shift amount (three chips and one sample) is added to the control amount (two samples), and is indicated from the phase difference detecting unit 30 to the timing controlling unit 40. The amount by which the reception timing is to be shifted is given as (−2 samples)+(3 chips+1 sample)=2 chips+7 samples. Thus, the reception timing is shifted by 2 chips+7 samples backward. Since the frequency of the sampling clock of the A/D converter 10 is $2^3$ (=8) times higher than that of chip clock, the amount by which the reception timing is shifted is calculated by the modulo-8 arithmetic operation which imposes no load on the hardware/software processing.

Another advantage is that since one chip is equal to 8 (=$2^3$) samples, a similar management is possible simply by using the carry from three bits in a sampling period unit, regardless of whether the reception timing is managed by the phase difference detecting unit 30 in a sampling period unit alone or in a sampling period plus chip unit.

The timing controlling unit 40 obtains the amount by which the reception timing is shifted, in accordance with the control amount and the shift amount indicated from the phase difference detecting unit 30. The correlator 20 shifts the reception timing by the amount obtained by the timing controlling unit 40, and thus obtains three correlation values as described above.

As explained above, with the CDMA receiver according to this embodiment, the phase difference detecting unit 30 and the timing controlling unit 40 can be configured of arithmetic processing means in simple hardware or software of modulo-$2^n$ by setting the frequency of the sampling clock of the A/D converter to the value $2^n$ times as high as that of the chip clock.

(Second Embodiment)

Figure 4:
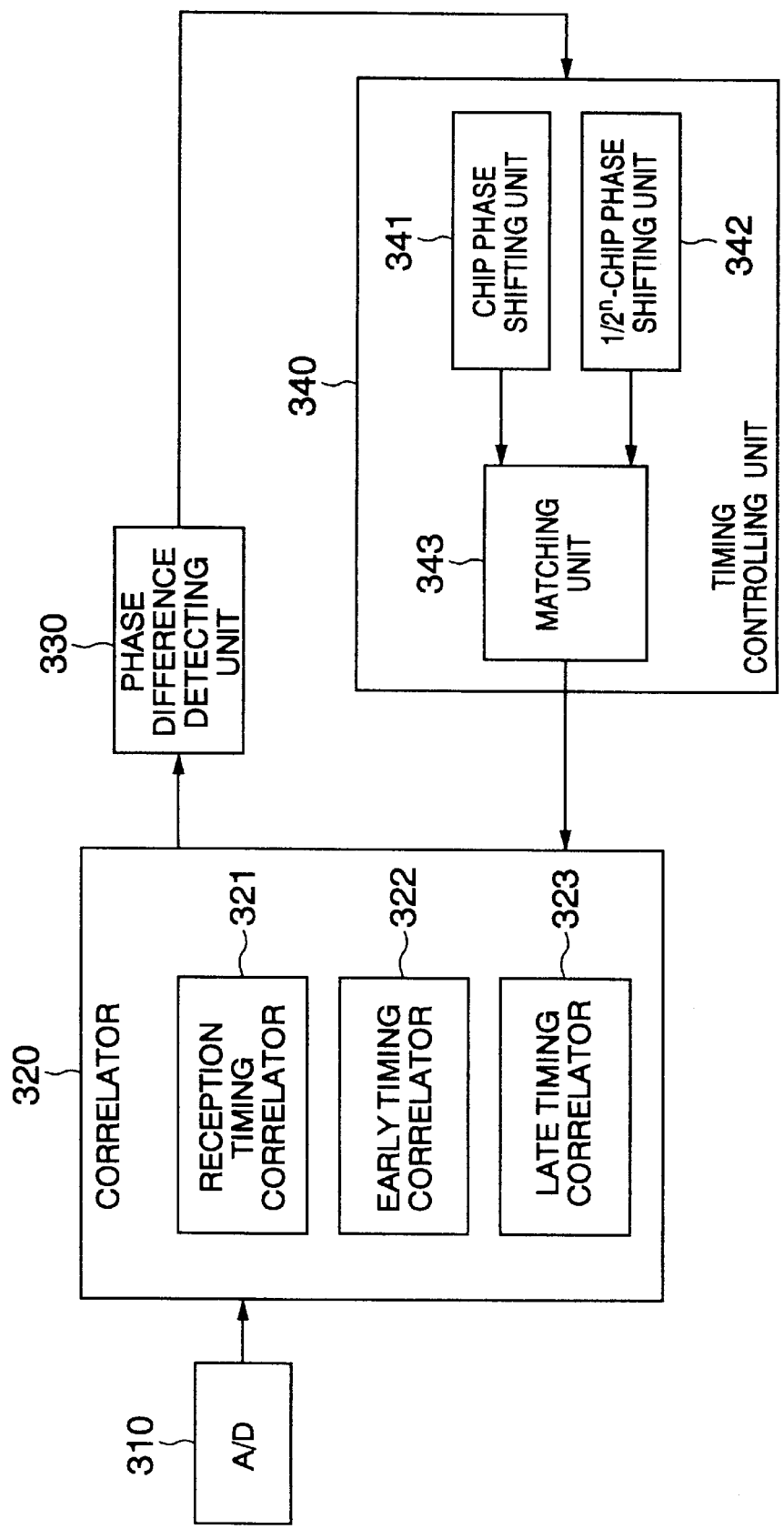
FIG. 4 is a block diagram showing a configuration of a CDMA receiver according to a second embodiment of the present invention.

In a CDMA receiver according to a second embodiment of the present invention, a frequency of a sampling clock of an A/D converter is set to a value $2^n$ times as high as that of a chip clock, and a phase shifting unit in chips and a phase shifting unit in $1/2^n$ chips (hereinafter referred to as a chip phase shifting unit and a $1/2^n$-chip phase shifting unit, respectively) are provided in a timing controlling unit. Specifically, the CDMA receiver according to this embodiment, as shown in FIG. 4, comprises an A/D converter 310; a correlator 320 including a reception timing correlator 321, an early timing correlator 322 and a late timing correlator 323; a phase difference detecting unit 330; and a timing controlling unit 340 including a chip phase shifting unit 341, a $1/2^n$-chip phase shifting unit 343 and a matching unit 343. The chip phase shifting unit 341 is for changing the reception timing in chips, and the $1/2^n$-chip phase shifting unit 342 is for changing the reception timing in sampling timings of the A/D converter 310. The matching unit 343 is for combining the reception timing changed by the chip phase shifting unit 341 with the reception timing changed by the $1/2^n$-chip phase shifting unit 342.

The operations of the A/D converter 310, the correlator 320 and the phase difference detector 330 of the CDMA receiver according to this embodiment are similar to those of the A/D converter 10, the correlator 20 and the phase difference detector 30 of the CDMA receiver according to the first embodiment shown in FIG. 2. Therefore, only the operation of the timing controlling unit 340 will be explained in detail below.

A phase shift amount indication data outputted from the phase difference detecting unit 330 to the timing controlling unit 340 indicates a phase shift amount in sampling timings of the A/D converter 310. Assuming that the frequency of the sampling clock of the A/D converter 310 is $2^3$ (=8) times as high as that of the chip clock and the amount of the phase shifted for the time of three chips (=3×8=24 sampling clocks) is indicated by the phase shift amount indication data, the phase shift amount indication data has a total of 5 bits. In the phase shift amount indication data, the two high-order bits indicates a phase shift amount in chips, and the three low-order bits indicates a phase shift amount in sampling timings of the A/D converter 310.

In the case where the two high-order bits of the phase shift amount indication data are "00", for example, the reception timing is not changed by the chip phase shifting unit 341. In the case where the two high-order bits of the phase shift amount indication data are "01", in contrast, the reception timing is changed by one chip, while in the case where the two high-order bits of the phase shift amount indication data are "10", the reception timing is changed by two chips by the chip phase shifting unit 341. In the case where the three low-order bits of the phase shift indication data are "000", for example, the reception timing is not changed by the $1/2^n$-chip phase shifting unit 342. In the case where the three low-order bits of the phase shift amount indication data are "001", the reception timing is changed by $1/2^3$ (=1/8) chips, while in the case where the three low-order bits of the phase shift amount indication data are "011", the reception timing is changed by $3/2^3$ (=3/8) chips by the $1/2^n$-chip phase shifting unit 342. The matching unit 343 combines the reception timing changed by the chip phase shifting unit 341 with the reception timing changed by the $1/2^n$-chip phase shifting unit 342 thereby to change the reception timing in accordance with the phase shift amount indication data supplied from the phase difference detecting unit 330. In the case where the phase shift amount indication data are "01011", for example, the reception timing changed by one chip in the chip phase shifting unit 341 and the reception timing changed by 3/8 chips in the $1/2^n$-chip phase shifting unit 342 are combined with each other by the matching unit 343, thereby producing the reception timing changed by (1+3/8) chips. The direction in which the phase of the reception timing is shifted is also indicated by the phase difference detecting unit 330 to the timing controlling unit 340.

As described above, in the CDMA receiver according to this embodiment, the timing controlling unit 340 includes the chip phase shifting unit 341, the $1/2^n$-chip phase shifting unit 342 and the matching unit 343. Therefore, the phase shift amount can be indicated from the phase difference detecting unit 330 to the timing controlling unit 340 in sampling timings of the A/D converter 310 (i.e. in $1/2^n$ chips).

(Third Embodiment)

Figure 5:
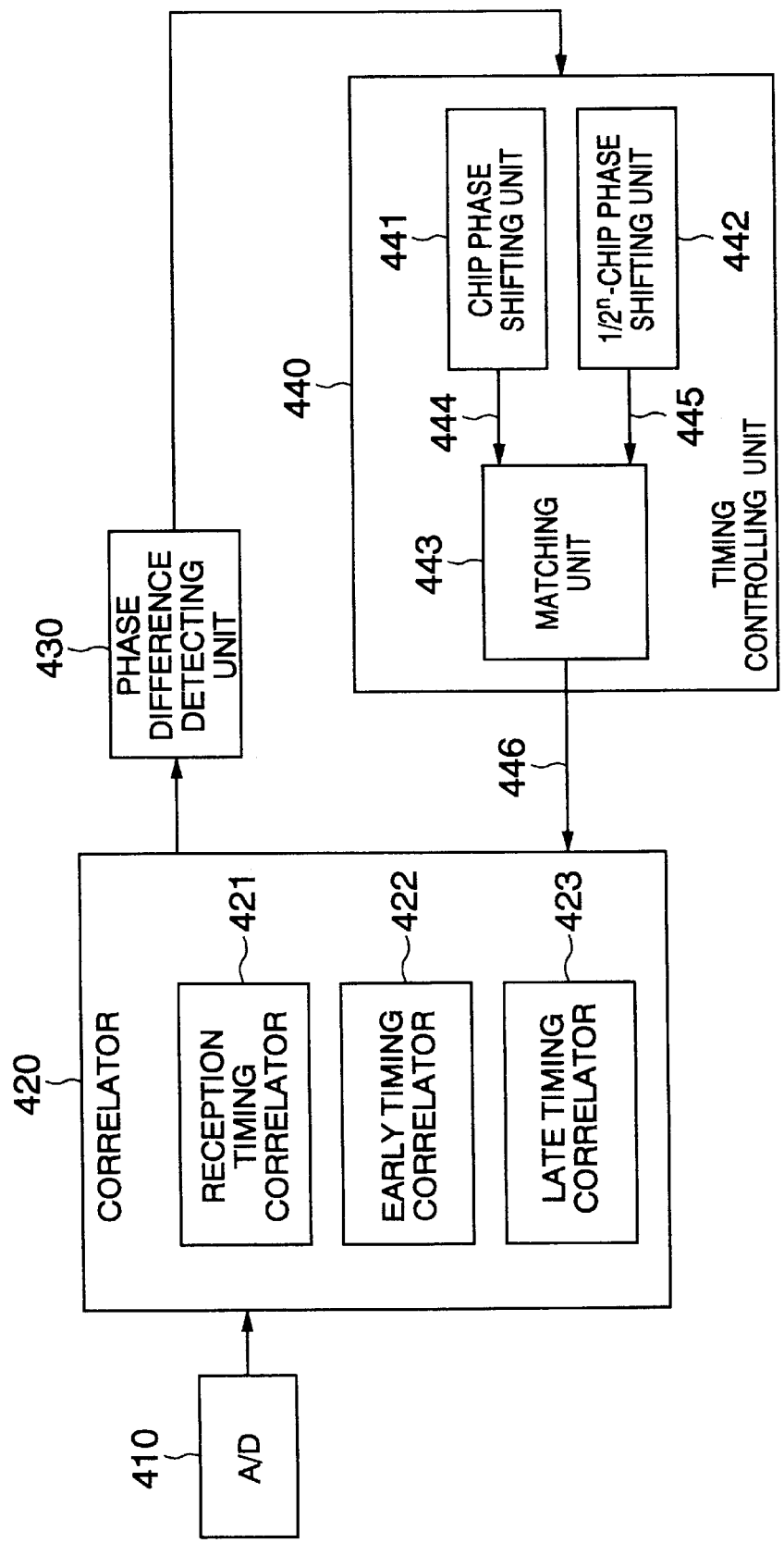
FIG. 5 is a block diagram showing a configuration of a CDMA receiver according to a third embodiment of the present invention.

In a CDMA receiver according to a third embodiment of the present invention, a frequency of a sampling clock of an A/D converter is set to $2^n$ times as high as that of a chip clock and a timing controlling unit including a chip phase shifting unit, a $1/2^n$-chip phase shifting unit and a matching unit is constituted using synchronizing circuits. Specifically, the CDMA receiver according to this embodiment comprises, as shown in FIG. 5, an A/D converter 410; a correlator 420 including a reception timing correlator 421, an early timing correlator 422 and a late timing correlator 432; a phase difference detecting unit 430; and a timing controlling unit 440 including a chip phase shifting unit 441, a $1/2^n$-chip phase shifting unit 442 and a matching unit 443. The chip phase shifting unit 441 is for changing the reception timing in chips and outputs a clock 444. The $1/2^n$-chip phase shifting unit 442 is for changing the reception timing in sampling timings of the A/D converter 410 and outputs a clock 445. The matching unit 443 combines the reception timing changed by the chip phase shifting unit 441 and the reception timing changed by the $1/2^n$-chip phase shifting unit 442 based on the clocks 444 and 445. The clock 446 outputted from the matching unit 443 functions as an enable signal for a synchronizing-system circuit activated in synchronism with the sampling clock of the A/D converter 410.

The operations of the A/D converter 410, the correlator 420 and the phase difference detecting unit 430 of the CDMA receiver according to this embodiment are similar to those of the A/D converter 10, the correlator 20 and the phase difference detecting unit 30 of the CDMA receiver according to the first embodiment. Therefore, only the operation of the timing controlling unit 440 will be described in detail below with reference to FIGS. 6A and 6B.

Figure 6A:
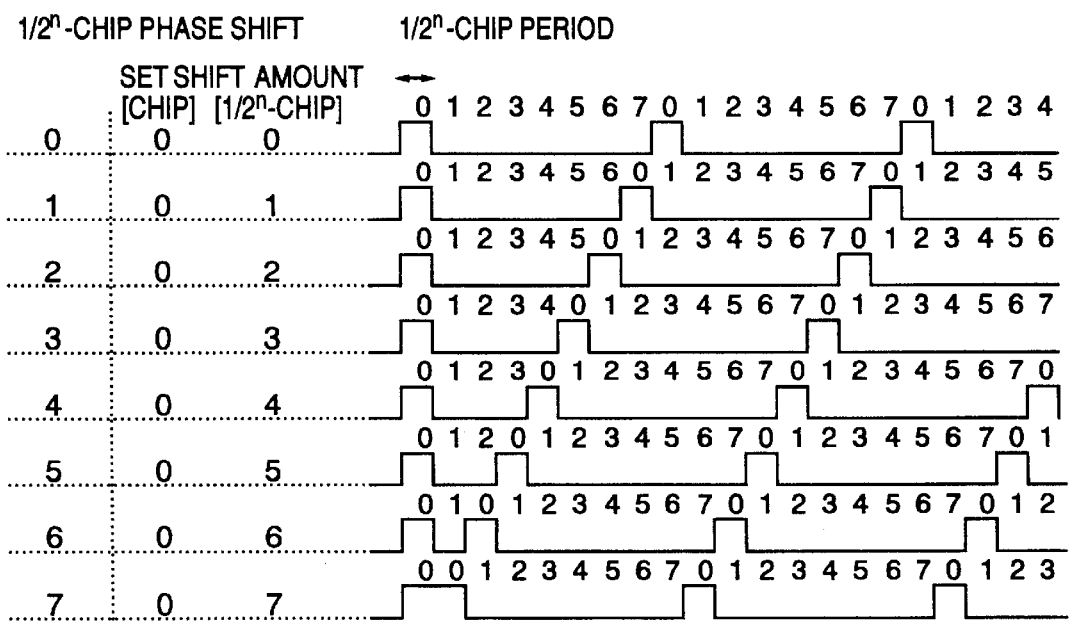
FIG. 6A is a diagram showing an example of an output signal of a $1/2^n$-chip phase shifting unit in the CDMA receiver of FIG. 5.

When a phase shift amount data is outputted from the phase difference detecting unit 430 to the timing controlling unit 440, the $1/2^n$-chip phase shifting unit 442 generates the clock 445 at timings shown in FIG. 6A. In the case where the phase shift amount indication data instructs the phase to be advanced by one clock period (1 clock=$1/2^3$ chips), for example, the clock 445 is generated at timing shown on the second line in FIG. 6A. In the case where the phase shift amount indication data instructs the phase to lag by 6 clock periods, the clock 445 is generated at timing shown on the seventh line in FIG. 6A. The clock 445 in high-level periods functions as an enable signal for a flip-flop (synchronizing-system circuit). For advancing the phase by one clock period, the enable signal is produced in such a manner as to activate the circuit one clock period longer, thereby advancing the circuit operation by one clock period.

Figure 6B:
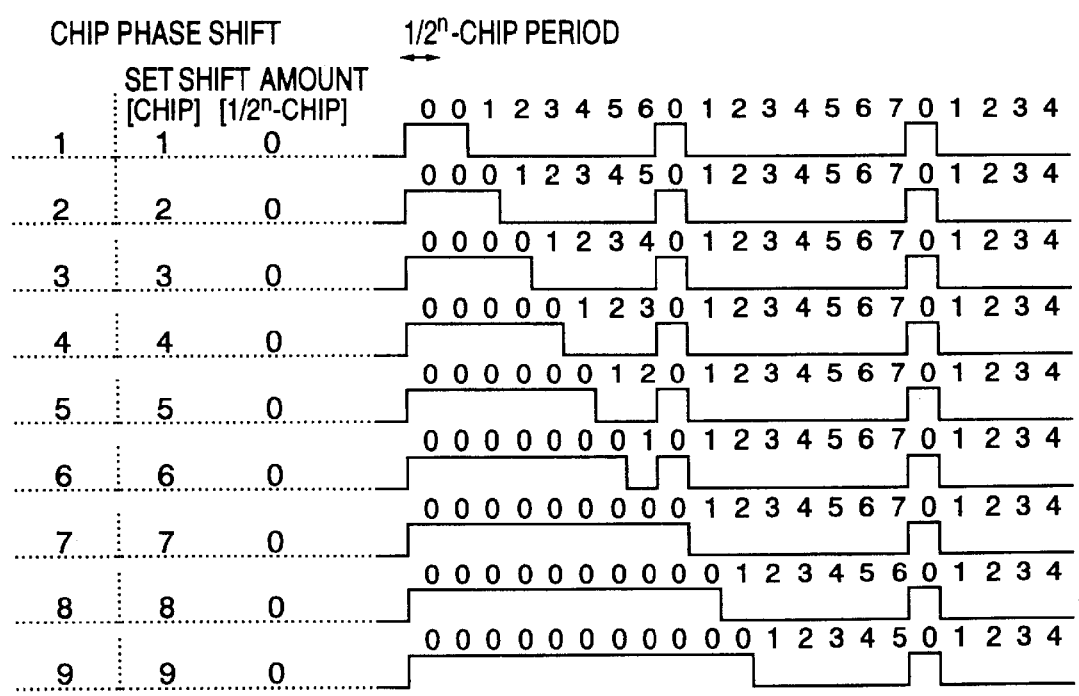
FIG. 6B is a diagram showing an example of an output signal of a chip phase shifting unit in the CDMA receiver of FIG. 5.

Upon application thereto of the phase shift amount indication data, the chip phase shifting unit 441 generates the clock 444 at timings shown in FIG. 6B. In the case where the phase shift amount indication data instructs the phase to be advanced by one chip period, for example, the clock 444 is generated at timing shown on the first line in FIG. 6B. In the case where the phase shift amount indication data instructs the phase to be advanced by nine chip periods, the clock 444 is generated at timing indicated on the ninth line in FIG. 6B. The clock 444 in high-level periods functions as an enable signal for each circuit (specifically, a flip-flop (synchronizing-system circuit)) of the correlator 420. For the phase to be advanced by one chip period, the next enable signal is outputted one chip period earlier thereby to advance the circuit operation by one chip period.

The matching unit 443 combines the clocks 444 and 445 with each other and outputs a clock 446 to the correlator 420. The clock 446 is applied to the enable signal input terminal of the flip-flop operating in synchronism with the sampling clock of the A/D converter 410. In the case where the matching unit 443 is configured as a simple OR circuit, the chip phase shifting unit 441 and the $1/2^n$-chip phase shifting unit 442 are required to be controlled so that the two clocks 444 and 445 may not be at high level at the same time. In the case where the chip phase shifting unit 441 and the $1/2^n$-chip phase shifting unit 442 have a simple circuit configuration, conversely, the matching unit 443 is required to be controlled in such a manner that the two clocks 444 and 445 may not assume a high level at the same time.

Also, in the case where the phase is delayed, three clocks 444 to 446 are generated in similar fashion. Although the example shown in FIGS. 6A and 6B is configured of a modulo-8 circuit with n of 3, the same applies to the case where n assumes another value (not less than 1).

It will thus be understood from the foregoing description that according to this embodiment, there is provided the CDMA receiver which has the timing controlling unit 440 configured of the synchronizing circuit and therefore can be easily implemented in hardware. At the same time, it has a high phase control rate and is stable against noises such as glitches.

What is claimed is:

1. A code division multiple access receiver comprising:

an A/D converter for over-sampling an analog reception baseband signal with a sampling clock having a frequency $2^n$ times higher than that of a chip clock and converting said analog reception baseband signal into a digital reception baseband signal;

a correlator for obtaining a correlation value between said digital reception baseband signal and a pilot spreading code which is synchronous with a reception timing;

a phase difference detecting unit for obtaining a phase difference between said digital reception baseband signal and said reception timing based on said correlation value; and a timing controlling unit for changing said reception timing in such a manner as to eliminate said phase difference, said timing controlling unit including a chip phase shifting unit for changing said reception timing in chips, and a $1/2^n$-chip phase shifting unit for changing said reception timing in $1/2^n$ chips.

2. A code division multiple access receiver according to claim 1, wherein said correlator includes:

a reception timing correlator for obtaining a correlation value between said digital reception baseband signal and a pilot spreading code which is synchronous with a first reception timing;

an early timing correlator for obtaining a correlation value between said digital reception baseband signal and a pilot spreading code which is synchronous with a second reception timing having a phase advanced from said first reception timing; and a late timing correlator for obtaining a correlation value between said digital reception baseband signal and a pilot spreading code which is synchronous with a third reception timing having a phase lagging behind said first reception timing.

* * * * *